United States Patent
Nefcy et al.

(10) Patent No.: US 9,533,677 B2
(45) Date of Patent: Jan. 3, 2017

(54) METHOD OF TRANSITIONING AMONG SHIFT SCHEDULES

(71) Applicant: FORD GLOBAL TECHNOLOGIES, LLC, Dearborn, MI (US)

(72) Inventors: Bernard D. Nefcy, Novi, MI (US); Daniel Scott Colvin, Farmington Hills, MI (US); Matthew John Shelton, Grosse Ile, MI (US); Mark Steven Yamazaki, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 66 days.

(21) Appl. No.: 14/468,720

(22) Filed: Aug. 26, 2014

(65) Prior Publication Data

US 2016/0059845 A1    Mar. 3, 2016

(51) Int. Cl.
| | | |
|---|---|---|
| *B60W 10/00* | (2006.01) | |
| *B60W 10/08* | (2006.01) | |
| *B60W 10/10* | (2012.01) | |
| *F16H 61/02* | (2006.01) | |
| *B60W 20/00* | (2016.01) | |
| *B60W 10/06* | (2006.01) | |
| *B60W 10/11* | (2012.01) | |
| *B60K 6/387* | (2007.10) | |
| *B60K 6/547* | (2007.10) | |
| *B60W 30/18* | (2012.01) | |
| *B60W 30/182* | (2012.01) | |
| *B60K 6/48* | (2007.10) | |

(52) U.S. Cl.
CPC .............. *B60W 20/30* (2013.01); *B60K 6/387* (2013.01); *B60K 6/547* (2013.01); *B60W 10/06* (2013.01); *B60W 10/08* (2013.01); *B60W 10/11* (2013.01); *B60W 20/14* (2016.01); *B60W 20/40* (2013.01); *B60W 30/182* (2013.01); *B60W 30/18127* (2013.01); *B60K 2006/4825* (2013.01); *B60W 2520/10* (2013.01); *B60W 2540/10* (2013.01); *B60W 2710/1005* (2013.01); *Y10S 903/93* (2013.01)

(58) Field of Classification Search
CPC ...... B60W 20/30; B60W 20/40; B60W 10/10; F16H 2061/0234; F16H 2061/0227
USPC .......................................................... 701/56
See application file for complete search history.

(56) References Cited

U.S. PATENT DOCUMENTS

| | | | | |
|---|---|---|---|---|
| 5,982,045 A | * | 11/1999 | Tabata ..................... | B60K 6/48 290/17 |
| 7,766,107 B2 | * | 8/2010 | Joe .......................... | B60K 6/48 180/65.21 |
| 7,770,678 B2 | * | 8/2010 | Nozaki .................... | B60K 6/48 180/65.265 |

(Continued)

*Primary Examiner* — Jacob S Scott
*Assistant Examiner* — Tinh Dang
(74) *Attorney, Agent, or Firm* — David B. Kelley; Brooks Kushman P.C.

(57) ABSTRACT

A hybrid electric vehicle having a discrete ratio transmission shifts according to distinct shift schedules in various operating modes. For example, different shift schedules may be used for operating with the engine off, operating with the engine running, and regenerative braking. When the vehicle transitions from one mode to another, the new shift schedule may schedule a shift that the driver would not expect. To avoid annoying the driver, a control strategy inhibits the shift until either the old strategy would also schedule a shift or a customer event occurs.

16 Claims, 5 Drawing Sheets

(56) References Cited

U.S. PATENT DOCUMENTS

| | | | |
|---|---|---|---|
| 7,908,063 B2 | 3/2011 | Sah | |
| 8,099,220 B2* | 1/2012 | Kim | F16H 61/0213 |
| | | | 477/97 |
| 8,224,539 B2 | 7/2012 | Heap | |
| 8,306,682 B2* | 11/2012 | Gray, Jr. | B60K 6/46 |
| | | | 477/5 |
| 8,694,218 B2* | 4/2014 | Shultz | F16H 61/0213 |
| | | | 477/110 |
| 2013/0184921 A1* | 7/2013 | Ueno | B60L 11/14 |
| | | | 701/22 |
| 2013/0231815 A1* | 9/2013 | Tanishima | B60K 6/48 |
| | | | 701/22 |
| 2013/0297162 A1 | 11/2013 | Dai et al. | |
| 2015/0353068 A1* | 12/2015 | Nefcy | B60W 10/10 |
| | | | 701/22 |
| 2016/0236674 A1* | 8/2016 | Mori | B60K 6/485 |

* cited by examiner

METHOD OF TRANSITIONING AMONG SHIFT SCHEDULES

TECHNICAL FIELD

This disclosure relates to the field of vehicle controls. More particularly, the disclosure pertains to scheduling the shifting of a discrete ratio transmission following an event that alters the shift schedule.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Many transmissions are designed to operate at a discrete number of fixed speed ratios. The available speed ratios may be referred to as gears or gear ratios even if there is not a direct correspondence between each ratio and a particular physical gear within the transmission. The ratios are typically numbered starting from the highest speed ratio and progressing to lower speed ratios. For example, 1st gear may have a speed ratio of 4.5, 2nd gear a speed ratio of 3.0, 3rd gear a speed ratio of 2.3, etc.

A particular speed ratio from the set of available speed ratios may be selected by engaging particular shift elements such as clutches or brakes. Shift elements may include actively controlled devices and passively controlled devices like one way clutches. When the currently selected speed ratio is not optimal, the transmission shifts to a different speed ratio by releasing one or more shift elements and engaging one or more shift elements. For example, if the currently selected speed ratio results in an engine speed which higher than optimal, the transmission may upshift to a lower speed ratio. On the other hand, if the engine speed is excessively slow, the transmission may downshift to a higher speed ratio. During the shift, vehicle occupants may notice variations in output torque and may notice changes in the engine sound. Vehicle occupants may be annoyed if the shift is rough and jerky, if a shift occurs when they weren't expecting one, or if no shift occurs when they do expect one.

Modern automatic transmissions utilize controllers both to decide when to shift and to control the shift elements to accomplish the shift as smoothly as possible. Sometimes, a controller schedules a shift event in direct response to an action performed by the driver such as an abrupt change in accelerator pedal position. In these circumstances, the driver may expect that the transmission will shift and will be pleased to feel a shift. At other times, a controller schedules a shift event due to a gradual change in vehicle speed or pedal position. Occupants expect some shifting of this type but are displeased if the transmission shifts too frequently. When a vehicle is cruising over level terrain at a steady speed, vehicle occupants expect the transmission to remain in the currently selected gear. Occupants may believe that a transmission shift during such steady state driving is an indicator of something wrong with the transmission.

SUMMARY OF THE DISCLOSURE

A hybrid electric vehicle includes an engine and a discrete ratio transmission selectively coupled to the engine by a disconnect clutch. In an electric only mode, a controller commands the disconnect clutch to disengage, shuts off the engine, and commands an electric motor to provide all of the propulsive power. In a hybrid electric mode, the controller commands the disconnect clutch to engage, and commands the engine to provide at least a portion of the propulsive power. The controller uses a different shift schedule in each mode to upshift and downshift the transmission as vehicle speed and accelerator pedal position fluctuate. When the controller changes from one mode to the other mode, the controller maintains the currently selected transmission ratio even though the new shift schedule may call for a shift. For example, with the engine running and the accelerator pedal held at a pedal position, the controller may upshift in response to the vehicle accelerating through a first speed. With the engine not running and the accelerator pedal held at the same pedal position, the controller may perform the same upshift in response to the vehicle accelerating through a second speed greater than the first speed. The vehicle may transition between modes by starting the engine at a third speed between the first and second speeds and maintain the present ratio despite the engine running shift schedule calling for an immediate upshift. The upshift may then be performed in response to the vehicle accelerating through the second speed. Alternatively, the upshift may be performed in response to a customer event such as a change in pedal position exceeding a threshold magnitude within less than a threshold time interval.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
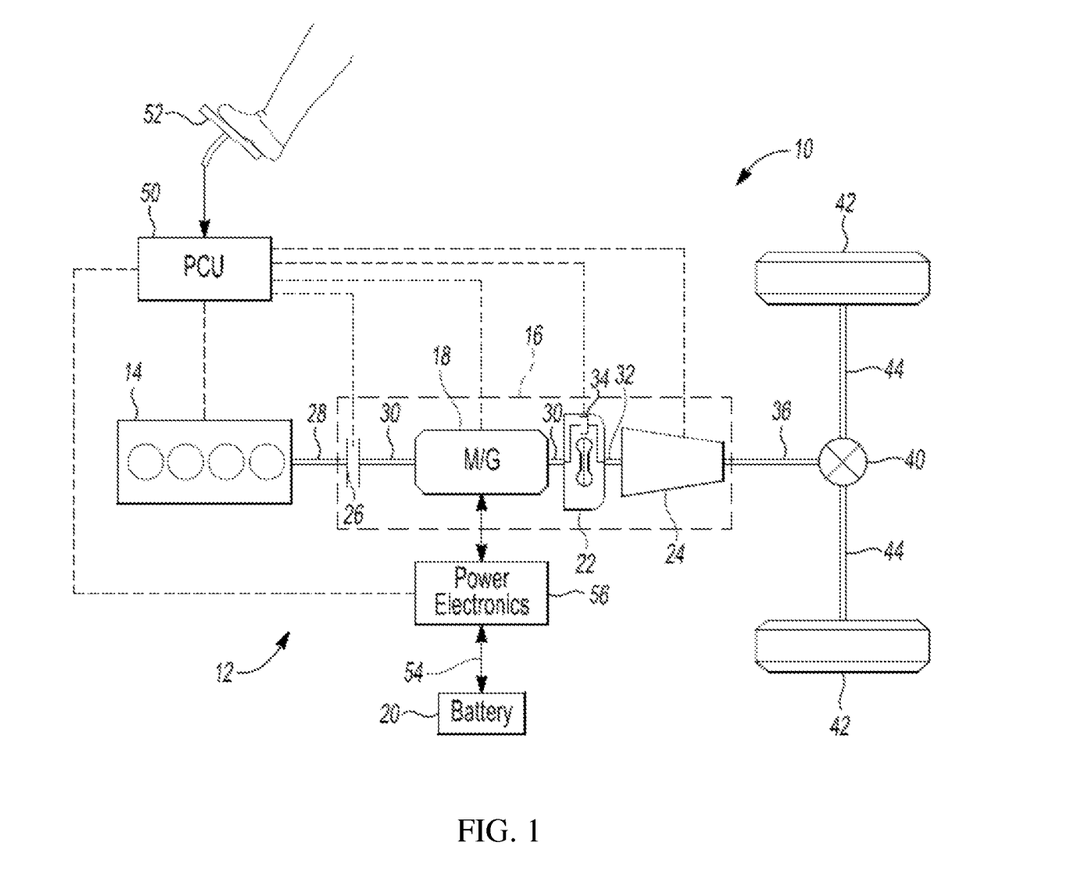
FIG. 1 is a schematic representation of a hybrid vehicle powertrain including a discrete ratio transmission.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, a launch clutch similar to disconnect clutch 26 may be provided between the M/G 18 and gearbox 24 for applications that do not include a torque converter 22.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit 50 (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 is released to isolate the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which energy is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Whether the vehicle is currently in hybrid mode, electric only mode, or any other mode, the transmission gear ratio determines the relationship between vehicle speed and the speed of M/G 18. If disconnect clutch 26 is engaged, the transmission ratio also determines the relationship between vehicle speed and engine speed. PCU 50 schedules transmission shifts in order to optimize the speeds of M/G 18 and engine 14 for current operating conditions. When power demand is high or anticipated to soon become high, a transmission ratio is selected that ensures that M/G 18 and engine 14 are capable of generating sufficient power. When power demand is low, a transmission ratio is selected that optimizes the efficiency of M/G 18 and engine 14. When disconnect clutch 26 is disengaged, such as in electric only mode, only the efficiency of M/G 18 need be considered. When disconnect clutch 26 is engaged, such as in hybrid mode, the efficiencies of both M/G 18 and engine 14 must be considered. Consequently, different shift schedules are utilized in hybrid mode and in electric only mode. When the driver is applying the brakes to slow down, a third shift schedule designed to optimize the amount of power recovered by M/G 18 may be used.

Figure 2:
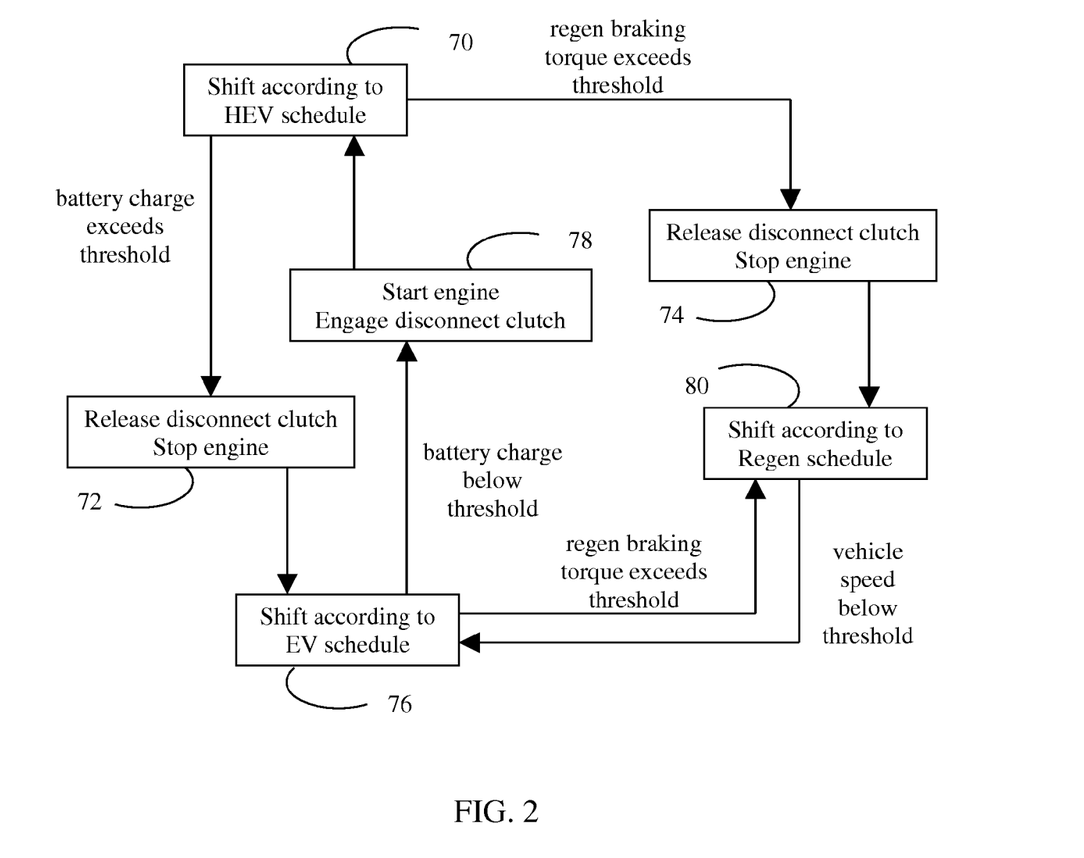
FIG. 2 is a flow chart describing transitions among a set of shift schedules.

FIG. 2 illustrates the transitions between three shift schedules: HEV, EV, and Regen. When the vehicle is operating in hybrid mode, transmission shifts are scheduled according to an HEV shift schedule as indicated at 70. Various conditions or events can cause a transition to a different mode with a different shift schedule. For example, if the battery state of charge increases above a threshold, the vehicle transitions to electric only mode by releasing the disconnect clutch and stopping the engine at 72. As another example, if the braking torque allocated to regenerative braking (as opposed to friction braking) exceeds a threshold, the vehicle may transition to a braking mode by releasing the disconnect clutch and stopping the engine at 74. When the vehicle is operating in electric only mode, transmission shifts are scheduled according to an EV shift schedule as indicated at 76. Since an electric motor is efficient at higher speeds than an internal combustion engine, the EV shift schedule selects a lower number gear ratio (higher speed ratio) than the HEV mode. If the battery state of charge decreases below a threshold while operating in electric only mode, the vehicle transitions to hybrid mode by starting the engine and engaging the disconnect clutch at 78. If the braking torque allocated to regenerative braking exceeds a threshold while in electric only mode, a transition to braking mode does not require any change in engine running state or disconnect clutch engagement state. When the vehicle is in braking mode, the transmission is scheduled according to a Regen shift schedule as indicated at 80. The vehicle may transition from braking mode to electric only mode when the vehicle speed drops below a threshold.

Figure 3:
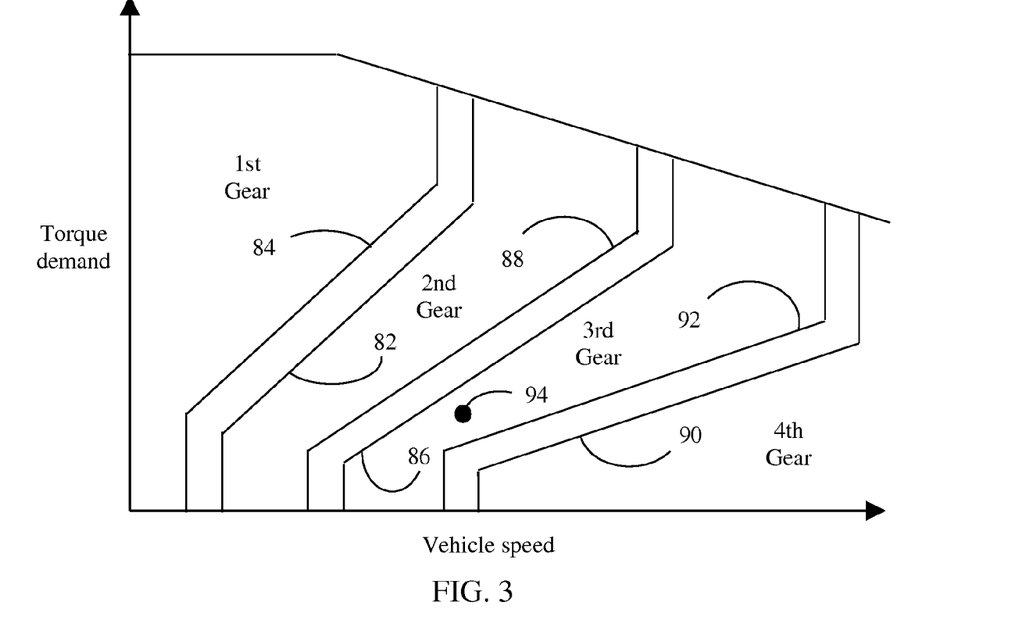
FIG. 3 is a graphical representation of a shift schedule for a hybrid electric operating mode.

FIG. 3 illustrates an exemplary shift schedule for operating the vehicle in hybrid mode. Although the shift schedule of FIG. 3 shows four forward gear ratios, embodiments may employ different numbers of forward gear ratios. The horizontal axis represents vehicle speed and the vertical axis represents driver demanded output torque. The driver demanded torque is generally computed based on vehicle speed and accelerator pedal position. In some embodiments, the vertical axis may be accelerator pedal position directly. When the current operating condition transitions from the left side of line 82 to the right side of line 82, an upshift from 1st gear to 2nd gear is scheduled. This can occur as a result of the vehicle speed increasing, as a result of the torque demand decreasing, or as some combination of the two. When the operating condition transitions from the right side of line 84 to the left side of line 84, a downshift from 2nd gear to 1st gear is scheduled. These lines are displaced from one another to avoid excessively frequent shifting between adjacent gears when the operating point varies slightly near a shift transition line. Similarly, lines 86 and 88 control upshifts from 2nd gear to 3rd gear and downshifts from 3rd gear to 2nd gear, respectively. Lines 90 and 92 control upshifts from 3rd gear to 4th gear and downshifts from 4th gear to 3rd gear, respectively. At low torque demand, the schedule tends to upshift as soon as the engine speed will be above a minimum in the higher gear. At high torque demand, upshifts are delayed until the engine speed reaches a maximum engine speed or the engine would be capable of generating more power in a higher gear. The control strategy may include modifiers to account for parameters other than vehicle speed and torque demand, such as acceleration rate or battery state of charge.

Figure 4:
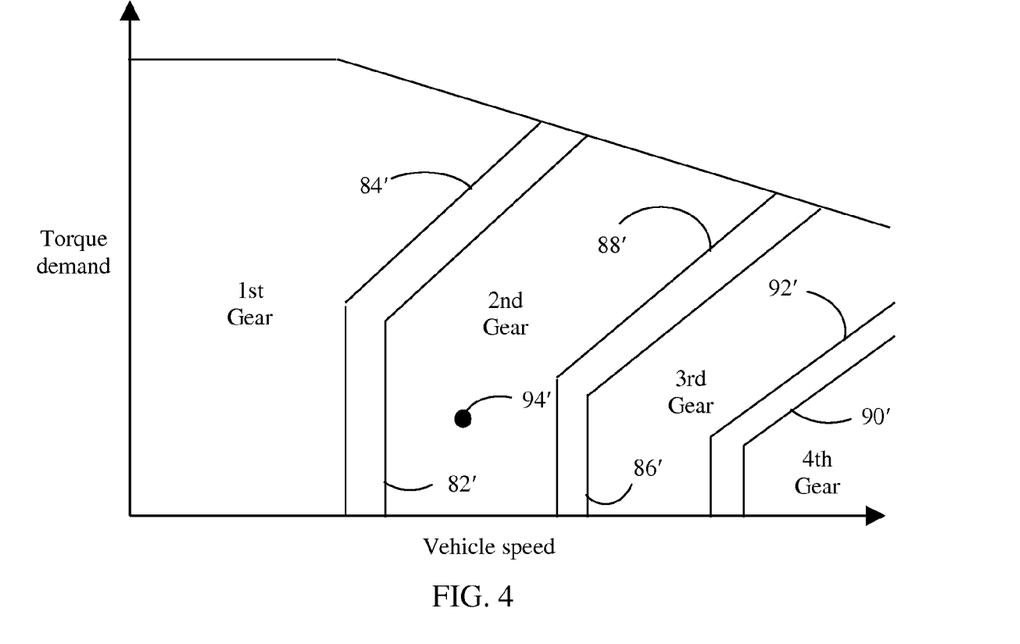
FIG. 4 is a graphical representation of a shift schedule of an electric only operating mode.

FIG. 4 illustrates an exemplary shift schedule for operating the vehicle in electric only mode. Lines 82', 86', and 90' control upshifts from 1st to 2nd, 2nd to 3rd, and 3rd to 4th, respectively. Similarly, lines 84', 88', and 92' control downshifts from 2nd to 1st, 3rd to 2nd, and 4th to 3rd, respectively. These lines are farther toward the right than the corresponding lines in FIG. 3. This could be because M/G 18 may operate more efficiently at higher speeds, making lower numbered gear ratios more desirable when engine 14 is disconnected. Notice that, if the vehicle changes from hybrid mode to electric only mode while operating at point 94, unless precautions are taken, the vehicle will shift from 3rd gear to 2nd gear. Since neither pedal position nor vehicle speed has changed, the driver would not be expecting a shift.

A different shift schedule may be utilized during regenerative braking. Like the electric only mode, the regenerative braking shift schedule is optimized to keep M/G 18 operating most efficiently. During braking, controller 50 determines the demanded torque, which is negative, based on the position of a brake pedal. The controller allocates some of the demanded torque to the friction brake system and some to the powertrain. For example, the friction brake system may be utilized more heavily if the battery state of charge is already high or during traction control events that require very rapid changes in braking torque. The shift schedule is primarily based on the powertrain component of the braking torque as opposed to the entire driver demanded torque. When the deceleration rate is high, the regenerative braking schedule may command multiple step downshifts to avoid needing to command several shifts in rapid succession. Since each shift requires some time, single step shifts might result in lower than desired M/G speed even if they were completed in rapid succession.

Figure 5:
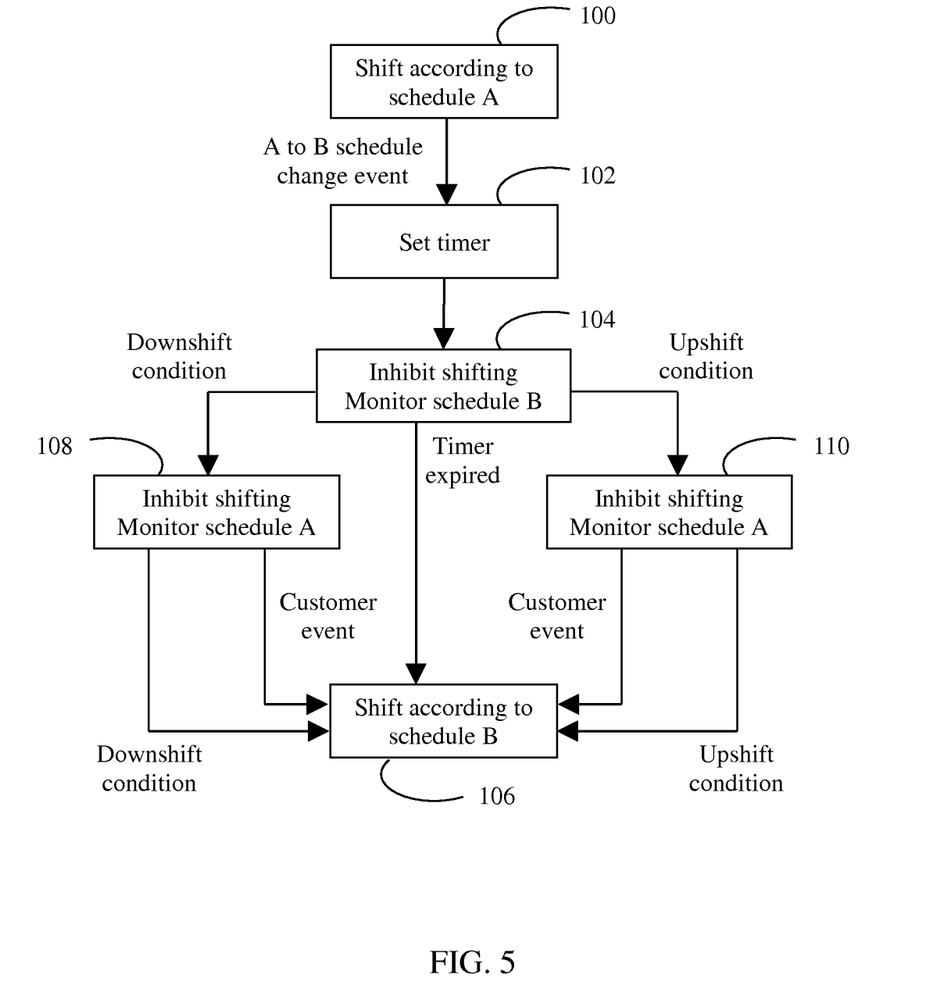
FIG. 5 is a flow chart describing a method of avoiding unexpected shift events following transitions among shift schedules.

FIG. 5 is a flow chart illustrating a method of avoiding unexpected shifts following a change in shift schedule. At 100, the vehicle is operating according to schedule A which could be the hybrid mode schedule of FIG. 3, the electric only mode schedule of FIG. 4, the regenerative braking schedule, or some other shift schedule. The method transitions to 102 when some event other than a driver command triggers a change to a different shift schedule B. The event could be, for example, a change in battery state of charge, a signal from a navigation system, a gradual change in pedal position, or various other events that a driver would either not be aware of or would not expect to result in a transmission shift. The controller sets a timer at 102 and then transitions to 104. At 104, the controller monitors shift schedule B, the new schedule, but does not command execution of any shifts that are triggered by schedule B. If the timer expires while at step 104, control moves to 106 where the controller operates the transmission according to schedule B. The timer period is set long enough that any shift that results directly from the change between shift schedules would be triggered while in state 104.

If a downshift conditions is indicated by schedule B while in state 104, control moves to 108. At 108, the controller monitors shift schedule A, the old shift schedule. While at 108, if a downshift condition is also indicated by schedule A, then control moves to state 106 where the shift commanded by schedule B is executed. The destination gear according to schedule B may differ from the destination gear according to schedule A. For example, schedule B may indicate a two-step shift from 4th gear to 2nd gear while schedule A indicates a single step shift from 4th gear to 3rd gear. In that circumstance, the two-step shift to 2nd gear would be executed at 106. If, while at 108, the driver initiates a change that he would expect to result in a shift, called a customer event, then control moves to 106. For example, if the driver moves the pedal rapidly or manipulates a mode selector, control would move immediately to 106. Upon entering state 106, the controller commands whatever gear is now indicated by schedule B, which may require a different shift than what was indicated before the customer event or may require no shift at all. Upshift conditions are handled in similar fashion. If an upshift is commanded while at state 104, control moves to state 110. Shifts are inhibited until schedule A also indicates an upshift or a customer event occurs.

Figure 6:
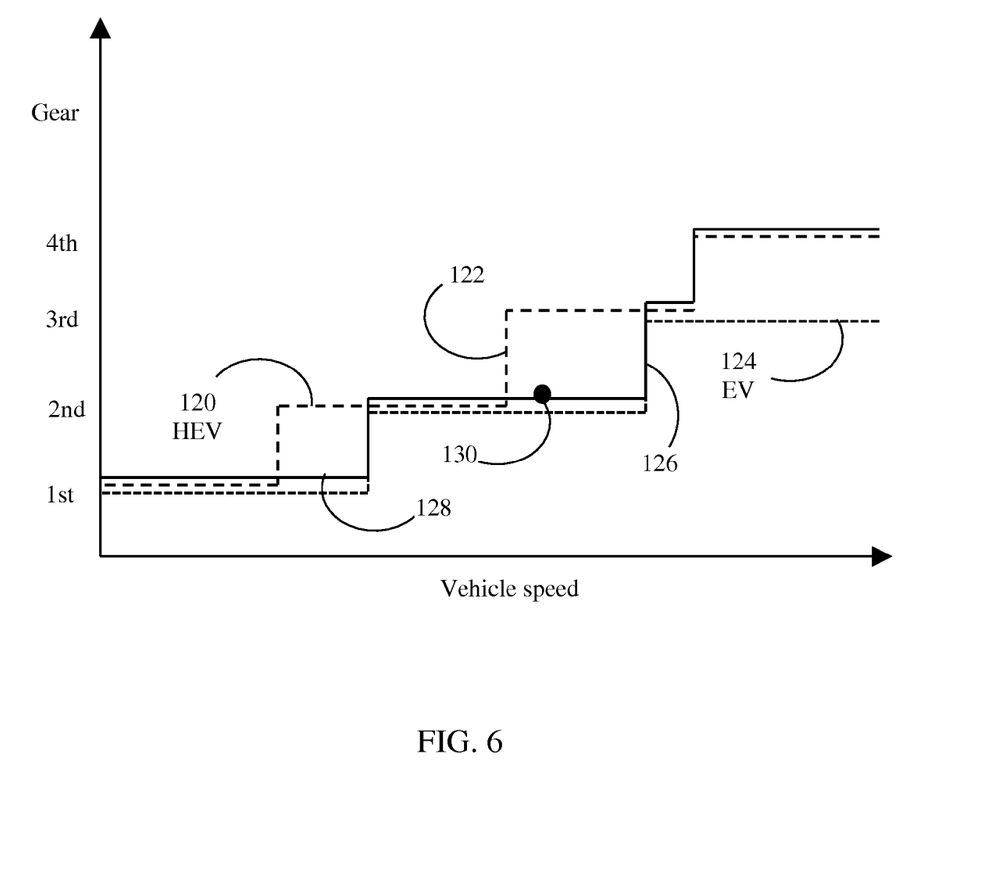
FIG. 6 is a graphical representation of a several exemplary scenarios according to the method of FIG. 5.

FIG. 6 illustrates the gear ratio progression as a vehicle accelerates at a constant pedal position under several different scenarios. In the scenario illustrated by line 120, the vehicle is in hybrid electric mode with the engine running throughout the acceleration. In this mode, an upshift from 2nd gear to 3rd gear is commanded at 122 at a first vehicle speed. In the scenario illustrated by line 124, the vehicle is in electric only mode with the engine stopped and the disconnect clutch disengaged throughout the acceleration. In electric only mode, an upshift from 2nd gear to 3rd gear is commanded at 126 at a second vehicle speed higher than the first vehicle speed. In the scenario illustrated by line 128, the vehicle starts in electric only mode but transitions to hybrid mode at 130 at a third speed between the first and second speeds. The transition may be triggered, for example, by the battery state of charge dropping below a threshold. The controller commands the engine to start at 130, but maintains the transmission in 2nd gear until the vehicle speed reaches the second speed. If the driver would have induced a customer event between point 130 and reaching the second speed, then any shift triggered by the HEV schedule would have occurred immediately after the customer event.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of operating a hybrid vehicle having a discrete ratio transmission comprising:
   operating the vehicle in a first engine state by shifting the transmission according to a first shift schedule, wherein, at a first vehicle speed and a first pedal position, the first shift schedule selects a first transmission ratio;
   operating the vehicle in a second engine state by shifting the transmission according to a second shift schedule, wherein, at the first vehicle speed and the first pedal position, the second shift schedule selects a second transmission ratio different from the first transmission ratio;
   while in the first transmission ratio, transitioning from the first engine state to the second engine state at the first vehicle speed and the first pedal position; and
   immediately following the transition from the first engine state to the second engine state, maintaining the transmission in the first transmission ratio.

2. The method of claim 1, further comprising:
   in response to a change, while maintaining the first transmission ratio, to a second vehicle speed and second pedal position at which the first shift schedule would select the second transmission ratio, shifting the transmission from the first transmission ratio to the second transmission ratio.

3. The method of claim 1, further comprising:
   in response to a customer event, while maintaining the first transmission ratio, shifting the transmission from the first transmission ratio to the second transmission ratio.

4. The method of claim 3 wherein the customer event comprises a change in pedal position exceeding a threshold magnitude and occurring within less than a threshold time interval.

5. The method of claim 1 wherein the first engine state is an engine off state and the second engine state is an engine running state.

6. The method of claim 1 wherein the first engine state is an engine running state and the second engine state is an engine off state.

7. A hybrid vehicle comprising:
   an engine;
   a discrete ratio transmission selectively coupled to the engine by a disconnect clutch; and
   a controller programmed to
      while the engine is running and an accelerator pedal is held at a pedal position, upshift from a first transmission ratio to a second transmission ratio in response to the vehicle accelerating through a first vehicle speed,
      while the engine is not running and the accelerator pedal is held at the pedal position, upshift from the first transmission ratio to the second transmission ratio in response to the vehicle accelerating through a second vehicle speed greater than the first speed, and
      while the engine is not running, the vehicle is moving at a third vehicle speed between the first and second vehicle speeds, and the accelerator pedal is held at the pedal position, start the engine and maintain the transmission in the first transmission ratio.

8. The hybrid vehicle of claim 7 wherein the controller is further programmed to:
after starting the engine and maintaining the transmission in the first transmission ratio, upshift to the second transmission ratio in response to the vehicle accelerating through the second vehicle speed.

9. The hybrid vehicle of claim 7 wherein the controller is further programmed to:
after starting the engine and maintaining the transmission in the first transmission ratio, upshift to the second transmission ratio in response to a customer event.

10. A method of operating a hybrid vehicle comprising:
operating the vehicle in a first mode by shifting a transmission according to a first shift schedule;
operating the vehicle in a second mode by shifting the transmission according to a second shift schedule; and
upon transitioning from the first mode to the second mode, releasing a disconnect clutch, stopping an engine, and delaying a next shift triggered by the second shift schedule.

11. The method of claim 10, further comprising, completing the next shift triggered by the second shift schedule in response to a change in a vehicle speed and a pedal position such that the first shift schedule would trigger a shift in a same direction.

12. The method of claim 10 further comprising, completing the next shift triggered by the second shift schedule in response to a customer event.

13. The method of claim 10 further comprising, upon transitioning from the second mode to the first mode, starting the engine, engaging the disconnect clutch, and delaying a next shift triggered by the first shift schedule.

14. The method of claim 13 wherein transitioning from the second mode to the first mode occurs in response to a battery state of charge decreasing below a threshold.

15. The method of claim 10 wherein transitioning from the first mode to the second mode occurs in response to a battery state of charge increasing above a threshold.

16. The method of claim 15 wherein transitioning from the first mode to the second mode occurs in response to a regenerative braking torque increasing above a threshold.

* * * * *